United States Patent [19]

Fletcher et al.

[11] 3,875,332

[45] Apr. 1, 1975

[54] DIGITAL TRANSMITTER FOR DATA BUS COMMUNICATIONS SYSTEM

[76] Inventors: James C. Fletcher, Administrator of the National Aeronautics and Space Administration with respect to an invention of; George Eugene Proch, Houston, Tex.

[22] Filed: Dec. 27, 1973

[21] Appl. No.: 428,994

[52] U.S. Cl. .................................. 178/58 A, 178/79

[51] Int. Cl. .............................................. H04l 5/16

[58] Field of Search ........... 330/15, 207 P; 307/270, 307/69; 340/345; 178/58 A, 63 B, 79; 179/15 AL

[56] References Cited

UNITED STATES PATENTS

| | | | |
|---|---|---|---|
| 3,408,589 | 10/1968 | Nishioka | 330/207 P |
| 3,478,274 | 11/1969 | Laurent | 330/15 |
| 3,657,734 | 4/1972 | Queen | 330/15 |
| 3,683,289 | 8/1972 | Rogers | 330/15 |

FOREIGN PATENTS OR APPLICATIONS

| | | | |
|---|---|---|---|
| 1,283,908 | 11/1968 | Germany | 330/207 P |

*Primary Examiner*—David L. Stewart

*Attorney, Agent, or Firm*—Marvin J. Marnock; Marvin F. Matthews; John R. Manning

[57] ABSTRACT

Disclosed is an improved digital transmitter for transmitting serial pulse-code modulation (pcm) data at high bit rates over a transmission line. When not transmitting, the transmitter features a high output impedance which prevents the transmitter from loading the transmission line. The pcm input is supplied to a logic control circuit which produces two discrete logic level signals which are supplied to an amplifier. The amplifier, which is transformer coupled to the output isolation circuitry, converts the discrete logic level signals to two high current level, ground isolated signals in the secondary windings of the coupling transformer. The latter signals are employed as inputs to the isolation circuitry which includes two series transistor pairs operating into a hybrid transformer functioning to isolate the transmitter circuitry from the transmission line. An effective increased amplitude, balanced, differential output signal is produced by the transmitter from the serial pcm input data to provide an improved transmitted signal to the transmission line.

8 Claims, 12 Drawing Figures

SERIAL PCM AT DATA INPUT 14

TRANSMIT CONTROL AT 15

WAVEFORM AT 18'

WAVEFORM AT 19'

WAVEFORM AT 20'

WAVEFORM AT 21'

WAVEFORM AT 23b

WAVEFORM AT 23c

WAVEFORM AT 36a

WAVEFORM AT 36b

MANCHESTER CODED OUTPUT AT 36c

TIME →

DIGITAL TRANSMITTER FOR DATA BUS COMMUNICATIONS SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

Broadly, the present invention relates to communication systems. Specifically, the present invention relates to an improved digital transmitter capable of providing the power amplification and output isolation required for transmission of high bit rate binary baseband signals over a data bus for half-duplex communications in multi-terminal systems. The transmitter of this invention is particularly suited for use in the NASA Triplex Flight Control System. In a specific application in this system, the transmitter is to be used with a Redundant Flight Control data bus, which is routed throughout the Orbiter vehicle employed in the NASA Space Shuttle program. The system is designed to provide multiplexed "party line" communication between various electronic packages remotely located in the vehicle.

2. Brief Description of the Prior Art

There are many basic circuits and devices capable of providing the output power required for high bit rate transmission. With these circuits and devices, modifying auxiliary circuits and devices must normally be employed to provide suitable coupling between the transmitter and the data bus or transmission line. In this regard, it is often necessary to modify the basic designs or devices to provide low impedance coupling for efficient power transfer from the transmitter to the transmission medium during transmission. Modification may also be required to provide high impedance coupling for isolating the transmitter from the transmission medium when the transmitter is not transmitting.

While known methods and devices are available and may be employed to improve output isolation characteristics, they are typically deficient for one or more reasons. For example, to achieve the desired results, the auxiliary or modified circuits often increase the "active" output impedance of the transmitter which produces a consequent reduction of power transfer efficiency. Such modifications may also require an extensive amount of circuitry with the need for larger supply voltages. Both positive and negative voltages may also be needed. Another problem experienced with conventional designs is that the isolation characteristics may be inadequate when the power supplies are off.

A basic transmitter employing a dual common emitter driver stage will exhibit negligible line loading with the unit power on but will also decrease the amplitude of signals on the line when the transmitter power is off. The basic deficiency of such common emitter circuits is that line signals drive the collector junctions into conduction which loads the transmission line. A modification to the basic common emitter circuit requiring the addition of two diodes provides negligible line loading independent of unit power, but results in a decrease in output amplitude and an increase in the output impedance of the transmitter.

It is also extremely important that the output isolation characteristics of transmitters employed in party line data bus systems prevent the driver stages of the transmitter from being driven into the conductive state when they are inactive. Such additional line loading from incompletely isolated transmitters causes waveform distortion which may result in false data transmission. It is also important to have short circuit protection in the event of a temporary or permanent short circuit on the transmission line. In the absence of such protection, even a temporary short circuit may destroy the output stages of the transmitters connected to the transmission line.

SUMMARY OF THE INVENTION

The present invention provides an improved digital transmitter primarily designed to transmit Manchester coded data at rates of 1.0 mega bits per second (MBPS) over a shielded, twisted pair transmission line that provides either dedicated or party line communications. The transmitter of the present invention is broken into three stages which include: logic control circuitry employed to control the mode of operation (ACTIVE, IDLE, OFF) of the transmitter as well as to steer the serial pcm input levels to the appropriate amplifier input; amplifier circuitry which amplifies the signals from the logic control circuitry to two, high current level, ground isolated signals; and output isolation circuitry providing a low impedance path between the supply and the output terminals when driven by the amplifier signals and a high impedance path between the output terminals and ground in the absence of amplifier signals. The desired isolation characteristics are achieved by employing two series transistor pairs which act as normally open switches except when the proper polarity signal is applied to their bases. Normally, the base-emitter junctions of the transistors are reversed biased driving them into the high impedance cutoff state. The presence of the proper polarity base-to-emitter signal forward biases the base-emitter junctions driving the transistors into their low impedance conduction state. The two series transistor pairs of the present invention are effective in providing improved output isolation and short circuit protection, with a minimum of circuit components using a single, low voltage power source.

In one embodiment, the digital transmitter of the present invention employs a simple, yet stable, digital circuit design requiring only a single power supply to provide balanced, differential output signals at peak to peak amplitudes of approximately twice the supply voltage and with sufficient amplification and output impedance to efficiently drive loads as low as 10 to 20 ohms. The transmitter also includes a low idle state power drain, an inherent output current limit for protection in the event of temporary or permanent short circuit loads, a high impedance output in both the idle state and when supply power is off, and an output circuit that cannot be driven into a low impedance state by signals on the data bus. In one embodiment, the entire digital transmitter is assembled with only five Dual-Inline-Packages which are commercially available. No internal or external controls are required.

Other features, and advantages of the present invention will become more readily apparent from the following specification, the related drawings and the claims.

DESCRIPTION OF THE ILLUSTRATED EMBODIMENT

Figure 1:
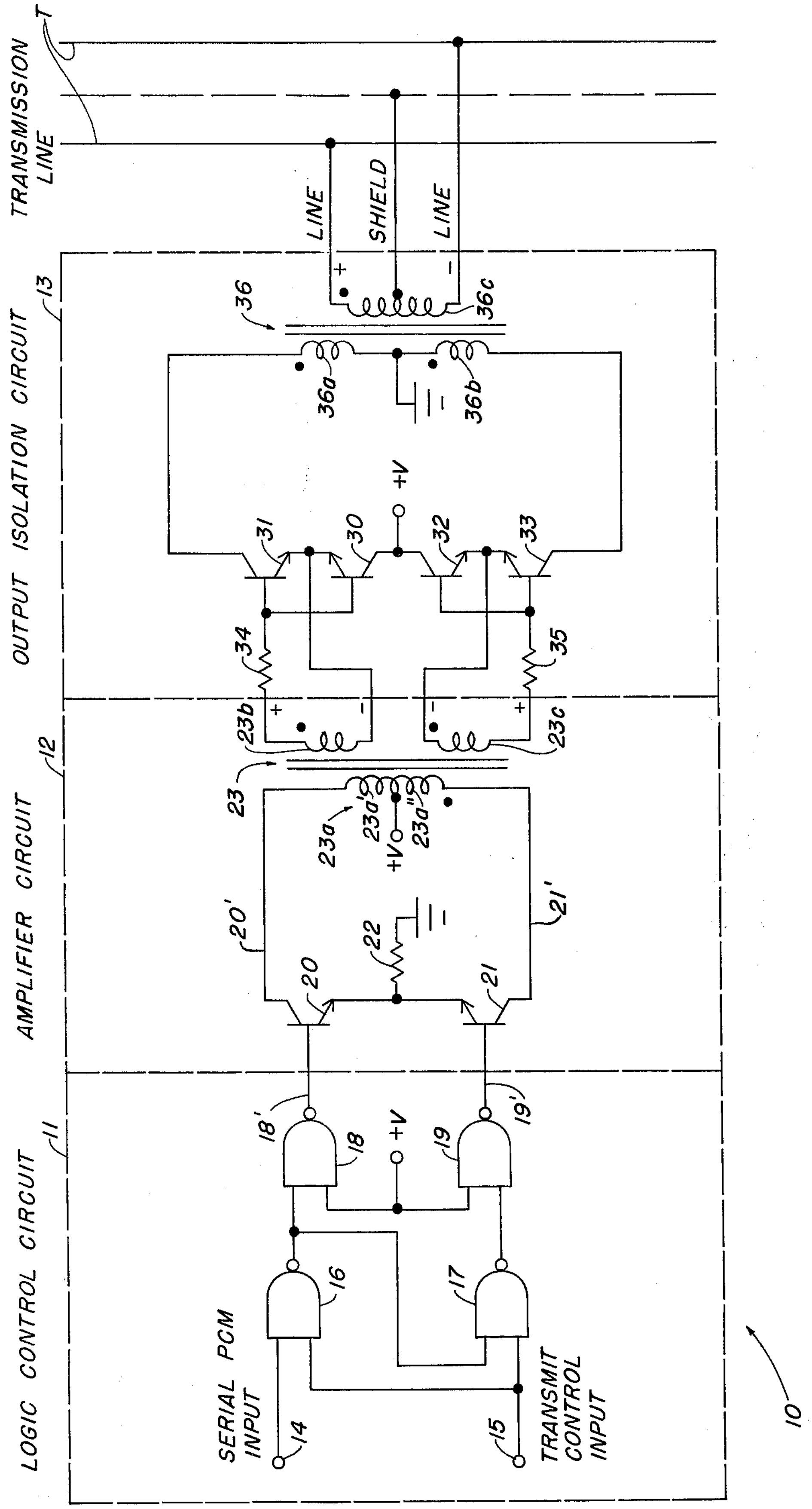
FIG. 1 schematically illustrates the digital transmitter of the present invention.

Referring to FIG. 1 of the drawings, the digital transmitter of the present invention, indicated generally at 10, includes a logic control circuit 11, an amplifier circuit 12, and an output isolation circuit 13. The logic control circuit 11 has a data input 14 and a transmit control input 15. The operating mode of the transmitter 10 is determined by the circuit 11 which employs four NAND gates 16, 17, 18 and 19 interconnected to provide output signals on lines 18' and 19'. The data input 14 is connected to one input of the gate 16, while the transmit control input 15 is connected to one input of gates 16 and 17. The second input to the gate 17 is supplied by the output of the gate 16, which is also connected to one input of the gate 18. The output of the gate 17 is connected to one input of the gate 19 with the remaining inputs of the gate 18 and the gate 19 connected to the power supply +V.

The logic control circuit 11 provides three modes of operation. One mode of operation is the OFF mode, in which the power supply +V is externally switched off and no power is supplied to the transmitter 10. A second operating mode of the transmitter 10 is the IDLE mode, in which the power supply +V is applied to the transmitter circuitry and a low level input signal is present at the transmit control input 15. The third mode of operation is the ACTIVE mode in which the power supply +V is applied to the transmitter circuitry and a high level input is present at the transmit control input 15. When the transmitter is in the ACTIVE mode and an input signal is present at 14, high and low discrete logic level output signals are produced on the lines 18' and 19' are supplied to the amplifier circuit 12. The output signal produced by the gate 18 on the line 18' is identical to the signal input to the data input 14, while the signal on the line 19' is the inverted signal input. Therefore, when the transmitter is in the ACTIVE mode, if the signal on line 18' is high, the signal on line 19' will be low and vice versa.

The amplifier circuit 12 includes transistors 20 and 21, a resistor 22, and a transformer 23. The transformer has a center-tapped primary winding indicated generally at **23*a* and secondary windings indicated generally at 23*b* and 23*c*. The emitters of the transistors 20 and 21 are connected through the resistor 22 to ground while the collectors of the transistors are connected to the power supply +V through windings 23*a*' and 23*a*'' included as portions of the primary winding 23*a*. The resistor 22 stabilizes the switching characteristics of the transistors 20 and 21 by increasing the signal level required to turn the transistors on and also slows the switching rise and fall times which reduces the high frequency spectral content of the signals appearing in the secondary windings 23*b* and 23*c*. The resistor 22** also limits the amount of collector current drawn by each transistor.

The line 18' supplies transistor 20 with an input signal while line 19' supplies an input signal to transistor 21. For the transistors to conduct, a proper signal level must appear at their bases. The proper signal level at the base of transistor 20 biases it into conduction causing a corresponding signal to be developed in the winding **23*a*'. Conduction of the transistor 21 produces a corresponding signal in the winding 23*a*'' when the proper signal level appears at the base of the transistor. Transistors 20 and 21 never conduct at the same time since the signals on line 18' and line 19'** are complementary signals.

The signals developed across each portion **23*a*' and 23*a*'' of the primary winding 23*a* are reflected in the secondary windings 23*b* and 23*c*. The secondary windings are connected such that the signal polarity across the winding 23*b* will be opposite to that across the winding 23*c*. The signals appearing across the secondary windings are high current level, ground isolated signals which are supplied to the output isolation circuit 13**.

The output isolation circuit 13 includes two series transistor pairs 30, 31 and 32, 33, resistors 34 and 35, and a hydbrid transformer 36 having a split primary winding **36*a* 36*b* 36b and a center-tapped secondary winding 36*c*. The transistor pair 30, 31 or 32, 33 is driven into conduction only when the proper polarity signal is applied to the respective bases of each pair from the transformer secondary windings 23*b* or 23*c*. At any given time, only one of the series transistor pairs 30, 31 or 32, 33 will be conductive since when one winding of the secondary provides a signal of the polarity required to bias the pair into conduction, the other winding is providing a signal which reverse biases the base-emitter junction of the other transistor pair. Thus, if the series transistor pair 30, 31 is conducting, the two transistors will provide a current limited, low impedance path between the power supply +V and ground, while transistor pair 32, 33** act as an open switch to present a high impedance path between the power supply +V and ground.

The current drawn by each series transistor pair 30, 31 and 32, 33 is limited by the base resistors 34 and 35 and the transistors 31 and 33. Transistors 31 and 33 provide an effective current gain of only one or two since they are operated in the inverted mode. Therefore, the maximum output current through the transistors 30 and 32 is limited by the base current through resistors 34 and 35 and by the inverted mode current gain of transistors 31 and 33. In the inverted mode, the transistros 31 and 33 exhibit a low gain so that the signal supplied to these transistors is initially amplified in the circuit 12. The transistors 30 and 32 are employed in the output circuit 13 to provide isolation between the transmission line T and the amplifier stage 12 independent of signal polarity.

Using the described circuit design, as the load impedance decreases, the output current will increase until the maximum current limit is reached. Any further decrease in the load impedance will have little effect on the output current. After the maximum current limit is reached, the effect of any further decrease in the load impedance will cause a corresponding decrease to occur in the transmitter output voltage. Thus, a built-in short circuit protection feature is provided in the event of a temporary or permanent short circuit on the transmission line.

The output signal appearing across the secondary winding **36*c* of the transformer 36 is a balanced, differential signal which is d.c. isolated from the amplifier circuit 12. The secondary winding 36c** is connected to a suitable transmission line T, which is preferably a shielded, twisted conductor pair suitable for use in a multi-terminal system.

In a multi-transmitter system, using the transmitters of the present invention, if a first transmitter is in the OFF or IDLE mode, while a second transmitter is in the ACTIVE mode, a signal appearing on the transmission line produced by the second transmitter cannot cause the series transistor pair of the first transmitter to conduct. A positive or negative voltage on the transmission line will reverse bias one of the two collector junctions of the first transmitter, driving or maintaining the configuration in the high impedance cutoff state. This in turn prevents the first transmitter from providing an additional load on the transmission line.

Figure 2:
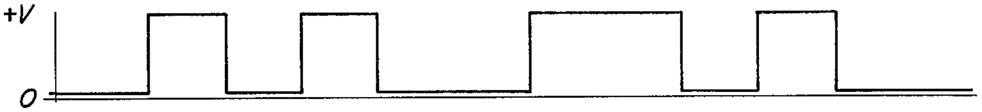
FIGS. 2–12 illustrate exemplary pulse coded waveforms appearing at different locations in the circuitry of the transmitter.
Figure 3:
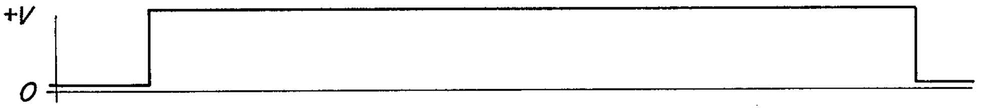

FIGS. 2–12, illustrate various waveforms present at different locations in the transmitter 10 in an exemplary situation. It will be appreciated that the waveforms are ideal waveforms and do not take into consideration rise and fall times and component tolerances. The waveforms in FIGS. 2–12 are aligned vertically to permit observation of the time relationships between the occurrence of changes in the levels of the input signal, the control signal and the signals appearing at the outputs of the logic, amplifier and isolation stages. All voltages are referenced to ground unless otherwise specified. The locations of the waveforms on the circuit of FIG. 1 are designated in FIGS. 2–12. FIG. 2 illustrates an exemplary serial pcm data input signal while FIG. 3 illustrates an exemplary transmit control signal. The waveform of FIG. 2 may be generated by any suitable, conventional equipment employed in digital communications. The waveform may be obtained for example from a sync multiplexer/data encoder which provides a serial pcm stream composed of phase encoded, sync, binary data and clock pulses. When the transmitter 10 is in the ACTIVE mode, a high level in the signal of FIG. 2 supplied to the input 14 causes a positive line pulse to appear on the transmission line T and a low level in the signal of FIG. 2 will cause a negative line pulse to appear on the transmission line.

The transmit control signal of FIG. 3 is a discrete voltage level applied at 15 which set the transmitter 10 in the IDLE mode when the control signal is low and in the ACTIVE mode when the control signal is high. The transmit control signal is also produced by the sync multiplexer. The data signal and the transmit control signal (FIG. 3) are appropriately correlated so that the latter signal functions to enable the transmitter just before data is applied to the terminal 14. The transmit control signal also serves to automatically disable the transmitter after the transmission of data is complete. By this means, the transmitter remains in the energy conserving IDLE mode except when data is being transmitted.

Figure 4:
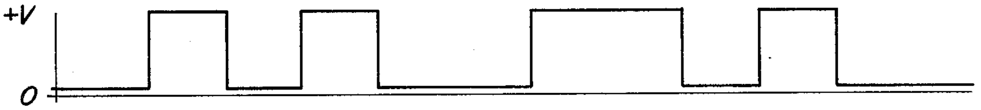
Figure 5:
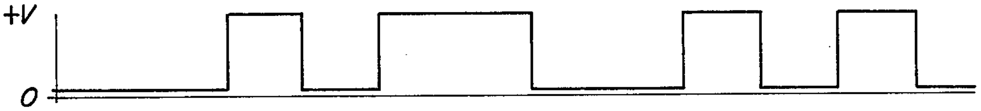

FIGS. 4 and 5 represent the signals produced by the logic control circuit 11 in response to the input signal of FIG. 2 as controlled by the control signal of FIG. 3. FIG. 4 is illustrative of the output signal on the line 18′, and FIG. 5 represents the output signal on the line 19′. The waveform of FIG. 4 is identical to the serial pcm data waveform of FIG. 2, while FIG. 5 is the complement of the waveform of FIG. 4 during the time the transmit control signal of FIG. 3 is at a high level. When the latter signal is at its low level, the output of the logic circuit drops low on both lines 18′ and 19′ irrespective of the level of the data signal of FIG. 2.

Figure 6:
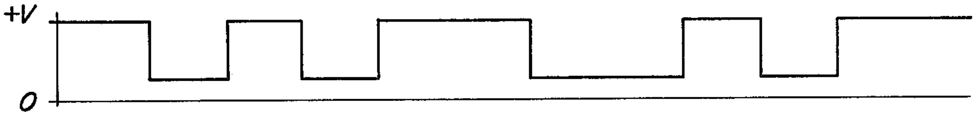
Figure 7:
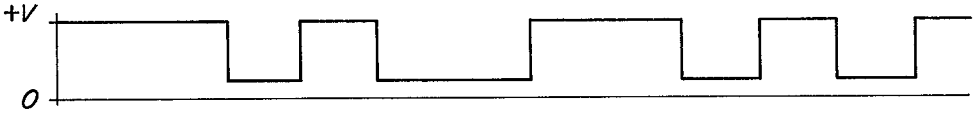

The waveforms of FIGS. 6 and 7 are illustrative of the waveforms appearing at thee collector's of transistors 20 and 21 respectively. The transistor 20 is forced into conduction when the waveform of FIG. 4 is high, and transistor 21 conducts when the waveform of FIG. 5 is high. The waveforms produced by the conduction of the transistors 20 and 21 are induced in the secondary windings **23*b* and 23*c* as the waveforms illustrated in FIG. 8 and 9. The conduction of the transistor 20 produces positive pulses in the winding 23*b* b and negative pulses in the winding 23*c*, while transistor 21 produces negative pulses in the winding 23*b* and positive pulses in the winding 23*c* when it is conducting. The waveform of FIG. 9 is 180° out-of-phase with the waveform of FIG. 8 due to the reversed connections of the secondary windings. The waveform of FIG. 8 controls the conduction of the series transistor pair 30, 31 and produces a waveform similar to the waveform of FIG. 10 across the primary winding 36*a* with respect to ground. At the same time, the waveform of FIG. 9 reverse biases the base-emitter junctions of the series transistor pair 32, 33 forcing them into cutoff. FIG. 11 is illustrative of the waveform across the primary winding 36*b* with respect to ground. FIGS. 10 and 11 are complementary signals, thus when series transistor pair 30, 31 is conducting, series transistor pair 32, 33** is cutoff and vice versa.

Figure 8:
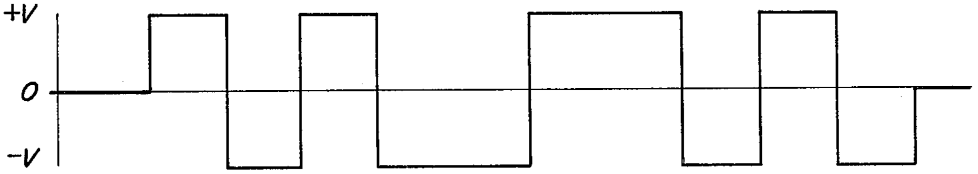
Figure 9:
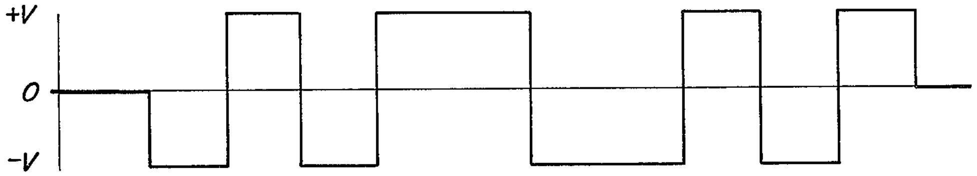
Figure 10:
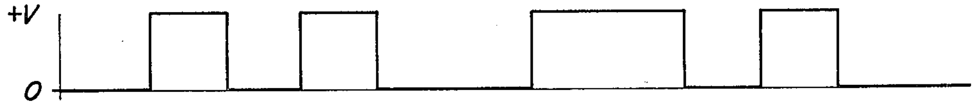
Figure 11:
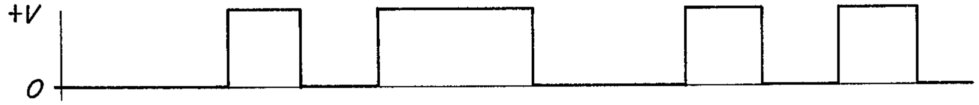
Figure 12:
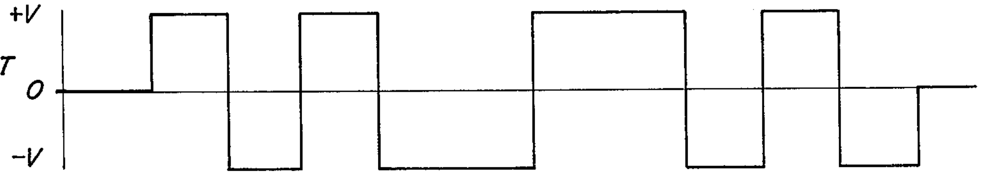

The negative transitions of the waveforms of FIGS. 8 and 9 reverse bias the base-emitter junctions of respective series transistor pairs 30, 31 and 32, 33 which is illustrated by the waveforms of FIGS. 10 and 11. The negative transition of the waveform of FIG. 8 is produced by the conduction of the transistor 21, while the negative transition of the waveform of FIG. 9 is produced by conduction of the transistor 20. Therefore, FIG. 10 represents the conduction of the transistor 20, and FIG. 11 represents the conduction of the transistor 21. The split primary winding **36*a* and 36*b* of the transformer 36 allows the waveform of FIG. 11 to be inverted thus providing a composite output signal produced in the secondary 36*c* of the transformer 36. This output signal is illustrated in FIG. 12. The signal illustrated in FIG. 12 is Manchester coded in that one half of the waveform is negative and the other half is positive with the transition between the two levels occurring in one half bit periods. The output signal appearing across the secondary winding 36*c* is thus a balanced, differential signal providing peak-to-peak amplitudes of about twice the supply voltage. The center-tap of the transformer winding 36*c*** is connected to the shield of the transmission line T while the ends of the winding are connected to the transmission line conductors.

The electrical components identified in the following listing were employed in the construction of one embodiment of the circuit 10.

RESISTORS

| Reference Character | Rating in Ohms |
|---|---|
| 22 | 11.3 |
| 34, 35 | 68 |

INTEGRATED CIRCUITS

| Reference Character | Manufacturer | Specification |
|---|---|---|
| 16, 17, 18<br>19, 20, 21, | Texas Instruments | SN 75450 Dual Peripheral Drivers |

RESISTORS-Continued

| Reference Character | Rating in Ohms |
|---|---|
| 30, 32, 33 | |
| 34 | |

TRANSFORMER

| Reference Character | Manufacturer | Specification |
|---|---|---|
| 23, 26 | Vari-L Co. Inc. | Model SH-70 Hybrid Pulse Transformer |

The following table provides representative transmitter characteristics exhibited by the transmitter of the present invention using the previously listed components.

TRANSMITTER CHARACTERISTICS

Supply Current:
Power supply + V = 5 Volts

| State | Current | Power |
|---|---|---|
| Idle | 38 ma | 0.19 watts |
| Operate into open circuit | 190 ma | 0.95 watts |
| Operate into 124 ohm line | 240 ma | 1.20 watts |
| Operate into short circuit | 270 ma | 1.35 watts |
| Transmit Enable high and Transmit Signal fails (high or low) | 310 ma | 1.55 watts |

Output:

| | |
|---|---|
| Voltage | 9.2 volts peak-peak |
| Current | 80 ma maximum |
| Rise and Fall time | 50–60 nanoseconds |
| Line load | negligible |

While the transmitter of the present invention has been described as producing Manchester coded data from serial pcm data, it is not necessarily so limited. The transmitter is capable of transmitting any type of waveform having fluctuating characteritstics of which there are many varieties. It may also be appreciated that the transmitter is capable of transmitting data over a wide range of frequencies and that the high and low frequency cutoff points are limited primarily only by the inherent transistor and transformer characteristics of the components employed in the circuit.

The foregoing disclosure and description of the invention is illustrative and explanatory thereof, and various changes in the size, shape and materials as well as in the details of the illustrated constructions may be made within the scope of the appended claims without departing from the spirit of the invention.

I claim:

1. An improved digital transmitter having an isolating coupling circuit means for coupling the transmitter to a transmission line, said isolating coupling circuit means comprising:
   a. first control means including electronic switching means responsive to a first control signal for providing either a low impedance or a high impedance pathway to said transmission line for a first output signal,
   said first control means including a first transistor pair being emitter-connected together to provide said first output signal when said first control signal is supplied to the bases of said first transistor pair;
   b. second control means including electronic switching means responsive to a second control signal for providing either a low impedance or a high impedance pathway to said transmission line for a second output signal,
   said second control means including a second transmission pair being emitter-connected together to provide said second output signal when said second control signal is supplied to the bases of said second transistor pair and the collector of one of the transistors in said second transistor pair being connected to the collector of one of the transistors in said first transistor pair; and
   c. means for holding said pathway in one of said control means at a high impedance when the pathway in the other of said control means is at a low impedance.

2. An improved digital transmitter having an isolating coupling circuit means for coupling the transmitter to a transmission line, said isolating coupling circuit means comprising:
   a. first control means responsive to a first control signal for providing either a low impedance or a high impedance pathway to said transmission line for a first output signal, said first control means including a first transistor pair being emitter-connected together to provide said first output signal when said first control signal is supplied to the bases of said first transistor pair;
   b. second control means responsive to a second control signal for providing either a low impedance or a high impedance pathway to said transmission line for a second output signal, said second control means including a second transistor pair being emitter-connected together to provide said second output signal when said second control signal is supplied to the bases of said second transistor pair and the collector of one of the transistors in said second transistor pair being connected to the collector of one of the transistors in said first transistor pair; and
   c. current limiting means in each of said pathways for limiting current flow through either of said pathways when the other of said pathways is providing a low impedance.

3. A transmitter as defined in claim 2 wherein said current limiting means includes maximum current limiting means comprising resistance means in the base circuits of said first and second transistor pairs.

4. An improved digital transmitter having an isolating coupling circuit means for coupling the transmitter to a transmission line, said isolating coupling circuit means comprising:
   a. first control means responsive to a first control signal for providing either a low impedance or a high impedance pathway to said transmission line for a first output signal, said first control means including a first transistor pair connected together to provide said first output signal when said first control signal is supplied to the bases of said first transistor pair;
   b. second control means responsive to a second control signal for providing either a low impedance or a high impedance pathway to said transmission line for a second output signal, said second control means including a second transistor pair connected together to provide said second output signal when said second control signal is supplied to the bases of said second transistor pair;

c. current limiting means in each of said pathways for limiting current flow through its associated pathway when the other of said pathways is providing a low impedance;

d. signal forming means for providing an inverse relationship between said first and second control signals; and e. means for simultaneously supplying said first and second signals to the bases of said first and second transistor pairs, said signal forming means including transformer means with plural secondary winding means, and one of said secondary winding means being included in the base-to-emitter circuit of each said transistor pairs.

5. A transmitter as defined in claim 4 wherein the primary of said transformer means is connected with amplifying circuit means providing two high current, ground isolated signals.

6. A transmitter as defined in claim 5 wherein said amplifying circuit means is connected with logic control means for forming two similar output signals from a single data input signal.

7. A transmitter as defined in claim 6 wherein said logic control means includes electronic switching means responsive to an input control signal for controlling the operation of said logic control means.

8. A transmitter as defined in claim 7 wherein said logic control means includes means for forming said two similar output signals only when said single input data signal and said input control signal are simultaneously supplied to said logic control circuit.

* * * * *